Figure 1:
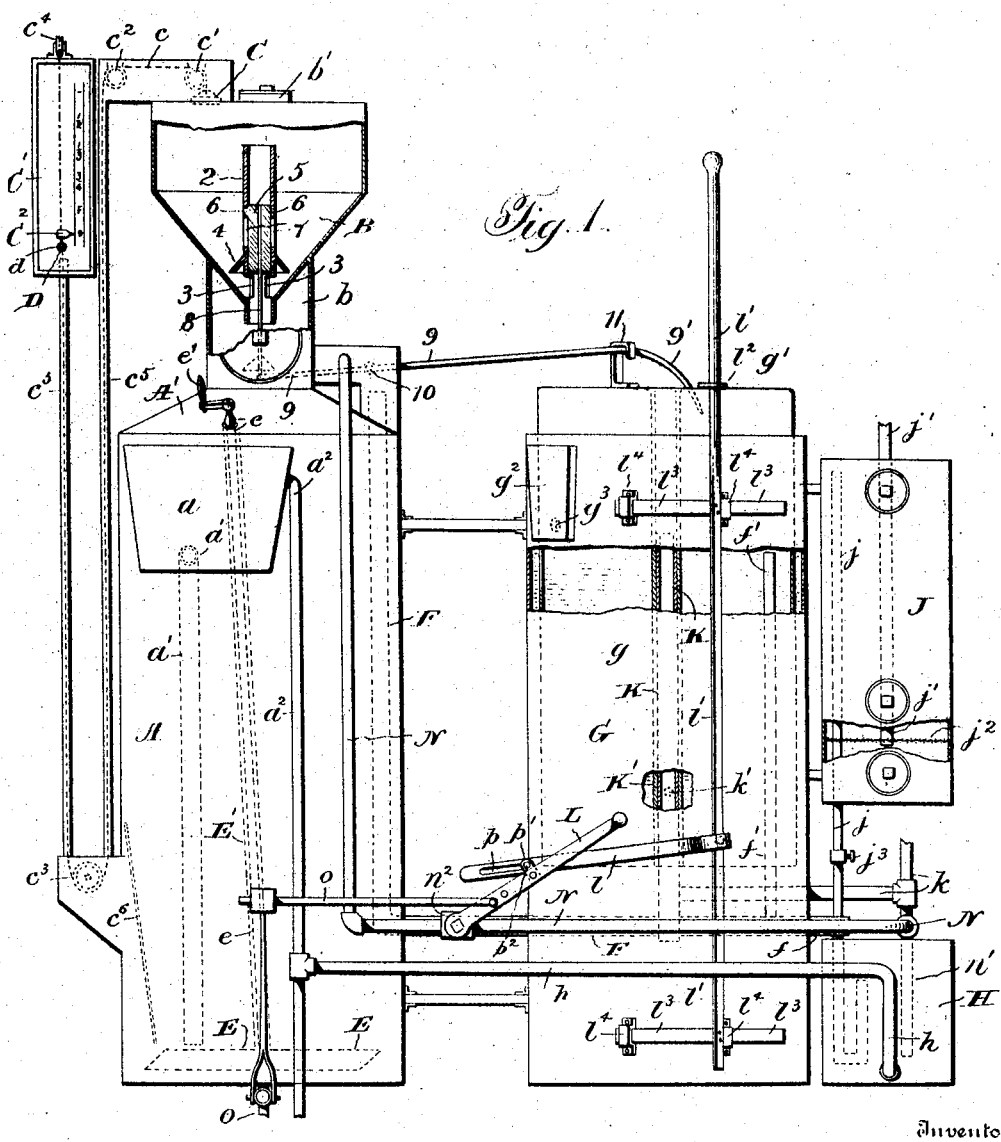

No. 773,022. PATENTED OCT. 25, 1904.
F. C. LORING.
ACETYLENE GAS GENERATOR.
APPLICATION FILED JUNE 26, 1903. RENEWED MAR. 19, 1904.
NO MODEL. 2 SHEETS—SHEET 1.

Witnesses:
Jas E Hutchinson
Calvin T. Milans

Inventor:
Frank C. Loring,
By Bacon & Milans
Attorneys.

No. 773,022. PATENTED OCT. 25, 1904.
F. C. LORING.
ACETYLENE GAS GENERATOR.
APPLICATION FILED JUNE 26, 1903. RENEWED MAR. 19, 1904.
NO MODEL. 2 SHEETS—SHEET 2.
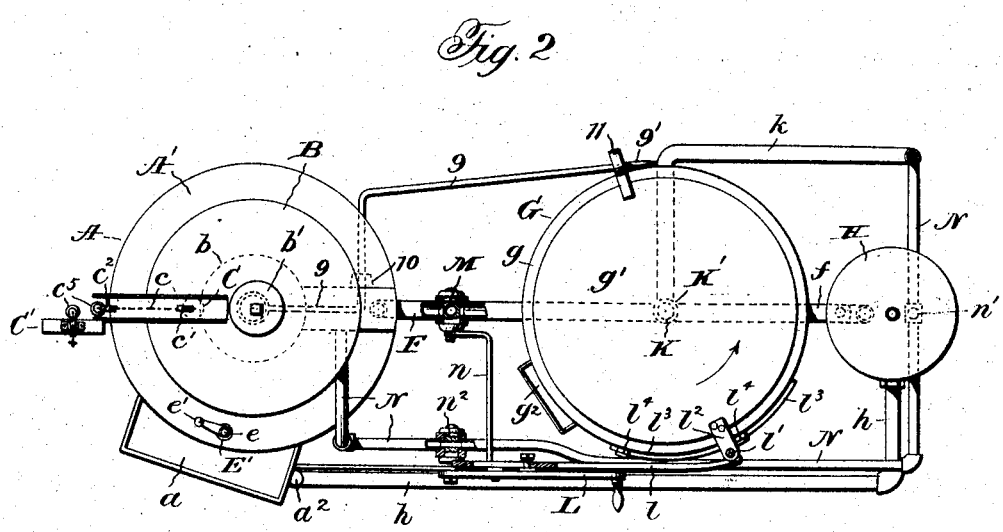
Fig. 2
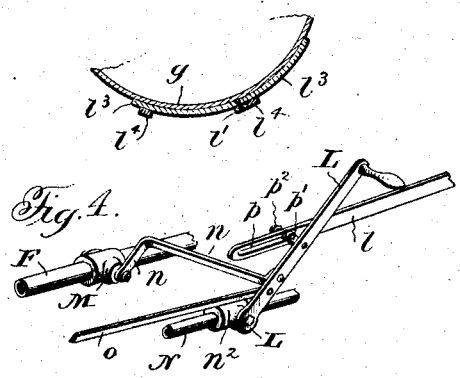
Fig. 3.
Fig. 4.
Witnesses
Jas E Hutchinson
Calvin P. Milans
Inventor:
Frank C. Loring,
By Bacon Milans
Attorneys.

No. 773,022. Patented October 25, 1904.

UNITED STATES PATENT OFFICE.

FRANK C. LORING, OF EASTPORT, MAINE.

ACETYLENE-GAS GENERATOR.

SPECIFICATION forming part of Letters Patent No. 773,022, dated October 25, 1904.

Application filed June 26, 1903. Renewed March 19, 1904. Serial No. 199,026. (No model.)

*To all whom it may concern:*

Be it known that I, FRANK C. LORING, a citizen of the United States, residing at Eastport, in the county of Washington and State of Maine, have invented certain new and useful Improvements in Acetylene-Gas Apparatus, of which the following is a specification, reference being had therein to the accompanying drawings.

This invention relates to an improved acetylene-gas apparatus, and has for its object the provision of an apparatus of that nature characterized by its simplicity of construction, ready manipulation, and efficiency in operation.

Novel details in the formation and arrangement of the several parts of the apparatus will be apparent from the detailed description hereinafter when read in connection with the accompanying drawings, forming part hereof, wherein a preferable embodiment of the invention is illustrated. Prominent among such details are the means for controlling the feed of carbid, the means for regulating the valves, and the means for indicating the quantity of carbid in the feed or supply hopper.

In the drawings, Figure 1 is a front elevation of the apparatus, parts being broken away. Fig. 2 is a top plan view. Fig. 3 is a detail horizontal sectional view, and Fig. 4 is a detail perspective view showing a pair of the regulating-valves and their actuating means.

Referring more specifically to the drawings, A designates a generator-tank, conveniently of cylindrical type, adapted to be provided with a suitable supply of water fed thereinto from the receptacle $a$ through the pipe $a'$, extending from the receptacle down to a point near the bottom of the tank, said receptacle being secured to the upper portion of the tank and opening through the side wall of the tank to the pipe $a'$, on the interior thereof.

B is a hopper for the carbid arranged above the generator-tank, so as to discharge into the open top thereof, the down-spout $b$ of the hopper being supported upon said top. This carbid-hopper receives its supply through the normally capped opening $b'$, and the discharge of said material from the hopper is controlled through the medium of the following instrumentalities: 2 represents a vertically-disposed tube mounted centrally within the hopper B and secured at its lower end to the discharge end of the hopper. This tube has a plurality of openings 3 adjacent to its lower end, through which carbid is adapted to fall from the hopper into the interior of the tube and thence to the generator. A deflector 4, secured to the tube 2, immediately above the openings 3 therein, directs the carbid outwardly from the tube and causes the same to travel in its downward course at the proper inclination to pass directly through said openings 3, thereby preventing clogging of the material at the discharge end of the hopper. To close the openings 3, a reciprocal plunger 5 is mounted in the tube 2, said plunger being provided with oppositely-disposed ears or projections 6, slidable in and guided by slotted portions 7 of the tube. Depending from the plunger-valve is an operating-stem 8, pivotally attached at its lower end to a rocking lever 9, the rocking lever 9 being in turn pivoted intermediate its ends at 10. Under certain conditions to be hereinafter pointed out the rocking lever elevates or lowers the plunger-valve 5 in an obvious manner.

It is desirable that some means be afforded for determining at any time the exact amount of carbid within the hopper B, and for this purpose a weight C is suspended at the top of the hopper from a cord or chain $c$, passing over guide-pulleys $c'$, $c^2$, $c^3$, and $c^4$, thence in a downward direction over the face of an indicator panel or board C′, bearing any suitable characters indicative of the height measurement or capacity of the hopper. The extreme end of the chain or cord $c$ carries a pointer $C^2$, arranged to move in a plane parallel with the characters on the panel C′, said pointer being held at zero, for instance, on the panel C′ by a ring $d$, carried by the pointer engaging over the end of a pin D, and incidentally the weight C is maintained in its suspended position. When, however, the quantity of material in the hopper is to be determined, the ring $d$ is withdrawn from engagement with the pin D and the weight C is permitted to draw the indicator-point upwardly until said weight rests upon the top of the carbid or material in the hopper, when the pointer registering with a particular character or characters on the panel C' will accurately indicate the desired information. The pointer is then restored to its normal position and locked against movement by the engagement of the ring with the hook, as aforesaid, it being understood that the pointer when disengaged is held by the hand of the operator against excessive upward movement owing to the weight of the down-run of the chain or cord leading from the pulleys $c^4$. The chain or cord is incased in water-sealed tubes $c^5$, opening at their lower ends into the tank A, protection for said lower ends of these pipes and for the chain and pulleys $c^3$ against clogging or interference by the carbid in the generator A being afforded by the partition $c^6$, suspended from the inner surface of the wall of said generator.

Water having been introduced into the generator-tank to a predetermined height and a supply of carbid having been permitted to fall thereinto, thorough intermingling of the same and constant generation of gas is facilitated by a rotary mixer comprising a shaft $e$, extending from the bottom of the generator-tank upwardly through the gas-dome A' thereof, said shaft at its outer end being provided with an operating-handle $e'$ and at its lower end with blades or paddles E in any desired number, two only being shown. The shaft just referred to is mounted loosely in a sleeve or bearing E', the same extending from without the gas-dome of the generator-tank to a point in adjacence with the bottom of said tank, whereby a water seal is provided against the escape of gas through the bearing of the rotary shaft. Any overflow of water in the tank A is carried off through the pipe $a^2$, leading from the side of the receptacle $a$ to any convenient point of discharge, probably a sewer.

The gas generated in the tank A and arising to the dome A' thereof will pass through the pipe F into and through a gasometer G, the gasometer comprising telescoping portions $g$ $g'$, the interfitting portions of which are sealed against the egress of gas by a body of water introduced through a receptacle $g^2$, discharging through the wall of the section $g$ through an opening $g^3$. A branch $f$ of the pipe F is arranged to discharge into a relatively small water-tank H and has its end bent to form a trap, as shown. A pipe $j$ extends from the upper portion of the tank H to the upper portion of a drier J and discharges into said upper portion. The outlet-pipe from the drier extends from a point near the bottom thereof out of the top of the same to furnish a supply of gas for immediate use, this pipe being designated by $j'$. A screen $j^2$ is interposed between the inlet and outlet of the drier, and any suitable filter or purifying material may be supported thereupon, it being clear that the gas will be compelled to flow from the discharge end of the pipe $j$ downwardly through the purifying material and screen $j^2$ before it again passes into and out through the pipe $j'$. The pipe $j$ is provided with a suitable controlling-valve $j^3$, and when this valve is closed, so as to prevent the admission of the gas to the drier, or when the consumption is not equal to the discharge from the drier the gas from the pipe F will be stored in the upper portion of the gasometer, as is usual, the gas being fed thereinto through the vertical branch $f'$ of said pipe F, the vertical branch being arranged wholly within the gasometer. Any overflow of water in the tank H will pass through the pipe $h$, communicating with the lower portion thereof, and at its opposite end opening into the overflow-pipe $a^2$.

To prevent an excessive supply of gas being stored within the gasometer G, I provide a central pipe K, closed at its lower end and opening at its upper end at a point above the water-line of the gasometer. This pipe is secured to the lower section $g$ and opens into the branch pipe $k$, which I will term a "blow-off" pipe. Secured to and carried by the section $g'$ of the gasometer and depending centrally therefrom so as to slide over the pipe K is a pipe K', closed at its upper end and opening at its lower end at a point approximately in the horizontal plane of the lower edge of said section $g'$. It will be appreciated that the water in the space between the pipes K and K' normally constitutes a seal against the escape of gas through the pipe K. However, the outer pipe K' is provided with a lateral aperture $k'$ near its lower end, through which aperture gas from the upper portion of the gasometer may escape when the section $g'$ has arisen to such a height as to bring said aperture above the water-line. By this arrangement the excess of gas will blow off incident to an automatic operation, whereby the use of the apparatus is in no sense dangerous.

The outer end of the valve-actuating lever 9 is curved downwardly, as at 9', so as to be in the path of movement of a hook 11, projecting upwardly from the section $g'$ of the gasometer. This section of the gasometer is rotatably mounted in the section $g$, the rotary movement being effected by means to be presently referred to, so that the hook 11 when the section $g'$ is low, owing to the scant quantity of gas in the gasometer, may be caused to ride over the curved end 9' of the lever 9 to throw the opposite end of the lever upwardly, whereby the plunger-valve 5 will be shifted clear of the openings 3 in the tube 2 to permit a fresh supply of carbid to feed into the generator-tank. When a sufficient quantity of carbid has been freed from the hopper, the section $g'$ of the gasometer is rotated in a reverse direction to carry the hook 11 away from the lever 9, whereupon the plunger-valve of the hopper will automatically fall or restore itself to its closed position. The rotary movement of the section g' is attained through the medium of an actuating hand-lever L, operatively associated with a link l, pivotally connected to a vertical rod l', passing loosely through an eye l² on the section g' of the gasometer, whereby said section may slide thereupon. At points intermediate its ends the vertical rod l' carries curved slides l³, adapted to work in separated guides or brackets l⁴, secured to the outer surface of the section g of the gasometer, the brackets being arranged in pairs and in vertical alinement, whereby they not only retain the slides l³ in proper position, but also constitute stops for limiting the lateral movement of the vertical rod l' in either direction, that of the present instance being approximately one-eighth of a revolution of the section g' of the gasometer, which has been found to be about right for the proper engagement and disengagement of the hook 11 with the lever 9.

A crank n is secured at one end to the hand-lever L and projects rearwardly therefrom, Fig. 2, the other end of said crank being connected to a valve M in the pipe F, adapted to regulate the passage of gas from the dome of the generator to the gasometer. The arrangement is such that when the hand-lever L is thrown to the extreme right, as shown in Fig. 1, the valve M is closed and the section g' of the gasometer rotated in the direction of the arrow by the link l and rod l' to operatively engage the hook 11 with the lever 9. A movement of the hand-lever in the opposite direction toward the left will correspondingly reverse the rotation of the section g', disengaging the hook 11 from the lever 9 and simultaneously opening the valve M to permit free passage of gas through the pipe F.

Preparatory to refilling the hopper B with carbid it is very desirable that the gas in the dome of the generator be vented therefrom, so that the gas cannot escape through the fill-opening of the hopper. For this purpose I provide a vent-pipe N, extending from said dome downwardly and thence into communication with the blow-off pipe k. A branch n', leading from the lower portion of the water-tank H, communicates with the vent-pipe N to permit the gas in said tank to blow off therethrough in the event of the gas-pressure therein becoming excessive and causing the water therein to recede to an abnormally low line. A valve n² in the vent-pipe N is directly connected with the lower end of the hand-lever L, and the ports therein are so disposed relative to the ports of the valve M that when the valve M is open the valve n² will be closed, and vice versa.

The hand-lever L performs still an additional function in that it is arranged to operate a drain O at the bottom of the generator A, the valve-stem extending upwardly and being pivotally connected to the end of a link o, which is in turn pivotally connected with the hand-lever. The ports of this drain-cock are arranged so that the same will be closed when the lever is thrown to the left and open when the lever is in the position shown in Fig. 1. The drain-cock, as well as the valves M and M'', are of a type to be operated upon a quarter-turn thereof, and inasmuch as one-eighth of a revolution of the section g' of the gasometer is sufficient to accomplish the desired ends accommodation must be made for this difference in movement when the several parts are controlled by one actuating-lever. A sliding connection is therefore provided between the hand-lever L and the link l by means of a slot p in the link and an auxiliary link p', pivoted to the hand-lever and carrying a headed pin p², working in said slot. By this arrangement the hand-lever may be moved a sufficient distance to operate the valves M M'' and cock O one-half their extent of movement before the pin p² will contact the link l at one end of the slot p, whereupon the further movement of the hand-lever will complete the shifting of the valves and cock to their full extent of movement and also rotate the section g' of the gasometer one-eighth of a revolution.

It is to be understood that while certain disclosures have been made herein it is simply with a view of facilitating a clear understanding of the invention, and it is not the intention to be limited to any special details of construction except in so far as any such details may be specifically included in the hereto-appended claims.

Having thus described the invention, what is claimed as new, and desired to be secured by Letters Patent, is—

1. In an apparatus of the character described, a generator, a gasometer, a hopper for supplying carbid to the generator, a valve in said hopper, and means for actuating said valve including a projecting member, and means for shifting a portion of the gasometer into and out of operative relation to said projecting member.

2. In an apparatus of the character described, a generator, a gasometer, a hopper for supplying carbid, a valve in said hopper, and means for actuating said valve including a projecting member, and means for rotating a portion of the gasometer into and out of operative relation to said projecting member.

3. In an apparatus of the character described, a generator, a gasometer, a hopper for supplying carbid to the generator, a valve in said hopper, and means for actuating said valve including a projecting member having a curved end, and means for rotating a portion of the gasometer into and out of operative relation to said curved end.

4. In an apparatus of the character described, a generator, a sectional gasometer, a hopper for supplying carbid to the generator, a valve in said hopper, and means for actuating said valve including a projecting member having a curved end, a hook carried by one section of the gasometer, and means for rotating said section to bring said hook into and out of operative relation to said curved end.

5. In an apparatus of the character described, a generator, a sectional gasometer, a hopper for supplying carbid to the generator, a valve in said hopper, and means for actuating said valve including a projecting member, and means for rotating one section of the gasometer into and out of operative relation to said projecting member, said rotating means including an operating-lever, and a rod secured to said section, and connected to the operating-lever.

6. In an apparatus of the character described, a generator, a sectional gasometer, a hopper for supplying carbid to the generator, a valve in said hopper, and means for actuating said valve including a projecting member, and means for rotating one section of the gasometer into and out of operative relation to said projecting member, said rotating means including an operating-lever, and a rod secured to said section slidable circumferentially of the other section of the gasometer and connected to the operating-lever.

7. In an apparatus of the character described, a generator, a sectional gasometer, a hopper for supplying carbid to the generator, a valve in said hopper, and means for actuating said valve including a projecting member, and means for rotating one section of the gasometer into and out of operative relation to said projecting member, said rotating means including an operating-lever, a rod secured to said section whereby the section may slide vertically thereon, said rod being slidable circumferentially of the other section of the gasometer, and a connection between the rod and the operating-lever.

8. In an apparatus of the character described, a generator, a sectional gasometer, a hopper for supplying carbid to the generator, a valve in said hopper, and means for actuating said valve including a projecting member, and means for rotating one section of the gasometer into and out of operative relation to said projecting member, said rotating means including an operating-lever, a rod secured to said section, said rod being slidable circumferentially of the other section of the gasometer, a curved slide on the rod, separated guides on said other section for the slide, and a connection between the rod and the separating-lever.

9. In an apparatus of the character described, a generator, a sectional gasometer, a hopper for supplying carbid to the generator, a valve in said hopper, and means for actuating said valve including a projecting member, and means for rotating one section of the gasometer into and out of operative relation to said projecting member, said rotating means including an operating-lever, a rod secured to said section, and a link between the rod and the operating-lever.

10. In an apparatus of the character described, a generator, a sectional gasometer, a hopper for supplying carbid to the generator, a valve in said hopper, means for actuating said valve controlled by the rotation of a section of the gasometer, a vent-pipe leading from the generator, a valve in said vent-pipe, and a single operating device for manipulating the valve in the vent-pipe and for rotating said section of the gasometer.

11. In an apparatus of the character described, a generator, a sectional gasometer, a hopper for supplying carbid to the generator, a valve in said hopper, means for actuating said valve controlled by the rotation of a section of the gasometer, a vent-pipe leading from the generator, a valve in said vent-pipe, a gas-supply pipe between the generator and the gasometer, a valve in said supply-pipe, and a single operating device for manipulating both last said valves and for rotating said section of the gasometer.

12. In an apparatus of the character described, a generator, a sectional gasometer, a hopper for supplying carbid to the generator, a valve in said hopper, means for actuating said valve controlled by the rotation of a section of the gasometer, a vent-pipe leading from the generator, a valve in said vent-pipe, a gas-supply pipe between the generator and the gasometer, a valve in said supply-pipe, a drain-cock at the bottom of the generator, and a single operating device for manipulating both last said valves and the drain-cock and for rotating said section of the gasometer.

13. In an apparatus of the character described, a generator, a sectional gasometer, a hopper for supplying carbid to the generator, a valve in said hopper, means for actuating said valve controlled by the rotation of a section of the gasometer, a vent-pipe leading from the generator, a valve in said vent-pipe, and a single operating device for manipulating the valve in the vent-pipe and for rotating said section of the gasometer including a lever, and a loose connection between said lever and the rotatable section of the gasometer, whereby the lever may be moved a predetermined extent to shift said valve prior to the movement of said section.

14. In an apparatus of the character described, a generator, a sectional gasometer, a hopper for supplying carbid to the generator, a valve in said hopper, means for actuating said valve controlled by the rotation of a section of the gasometer, a vent-pipe leading from the generator, a valve in said vent-pipe, a gas-supply pipe between the generator and the gasometer, a valve in said supply-pipe, and a single operating device for manipulating both last said valves and for rotating said section of the gasometer including a lever, and a loose connection between said lever and the rotatable section of the gasometer whereby the lever may be moved a predetermined extent to shift said valves prior to the movement of said section.

15. In an apparatus of the character described, a generator, a sectional gasometer, a hopper for supplying carbid to the generator, a valve in said hopper, means for actuating said valve controlled by the rotation of a section of the gasometer, a vent-pipe leading from the generator, a valve in said vent-pipe, a gas-supply pipe between the generator and the gasometer, a valve in said supply-pipe, a drain-cock at the bottom of the generator, and a single operating device for manipulating both last said valves and the drain-cock and for rotating said section of the gasometer including a lever, and a loose connection between said lever and the rotatable section of the gasometer whereby the lever may be moved a predetermined extent to shift said valves and cock prior to the movement of said section.

16. In an apparatus of the character described, a generator, a sectional gasometer, a hopper for supplying carbid to the generator, a valve in said hopper, means for actuating said valve controlled by the rotation of a section of the gasometer, a gas-supply pipe between the generator and the gasometer, a valve in said supply-pipe, and a single operating device for manipulating the valve in the supply-pipe and for rotating said section of the gasometer.

17. In an apparatus of the character described, a generator, a sectional gasometer, a hopper for supplying carbid to the generator, a valve in said hopper, means for actuating said valve controlled by the rotation of a section of the gasometer, a gas-supply pipe between the generator and the gasometer, a valve in said supply-pipe, and a single operating device for manipulating the valve in the supply-pipe and for rotating said section of the gasometer including a lever, and a loose connection between said lever and the rotatable section of the gasometer whereby the lever may be moved a predetermined extent to shift said valves prior to the movement of said section.

18. In an apparatus of the character described, a generator, a sectional gasometer, a hopper for supplying carbid to the generator, a valve in said hopper, means for actuating said valve controlled by the rotation of a section of the gasometer, a drain-cock at the bottom of the generator, and a single operating device for manipulating the drain-cock and for rotating said section of the gasometer.

19. In an apparatus of the character described, a generator, a sectional gasometer, a hopper for supplying carbid to the generator, a valve in said hopper, means for actuating said valve controlled by the rotation of a section of the gasometer, a drain-cock at the bottom of the generator, and a single operating device for manipulating the drain-cock and for rotating said section of the gasometer including a lever, and a loose connection between said lever and the rotatable section of the gasometer, whereby the lever may be moved a predetermined extent to shift said drip-cock prior to the movement of said section.

In testimony whereof I affix my signature in presence of two witnesses.

FRANK C. LORING.

Witnesses:
H. H. CUSHING,
A. HELBORE.